United States Patent [19]

Rosset

[11] Patent Number: 5,445,066
[45] Date of Patent: Aug. 29, 1995

[54] COOKING APPLIANCE HAVING A COOKING PLATE PROVIDED WITH OPENINGS

[75] Inventor: Roger Rosset, Bloye, France

[73] Assignee: SEB S.A., Selongey, France

[21] Appl. No.: 227,231

[22] Filed: Apr. 13, 1994

[30] Foreign Application Priority Data

Apr. 21, 1993 [FR] France .................. 93 04688

[51] Int. Cl.⁶ .................................. A47J 27/00
[52] U.S. Cl. ........................... 99/446; 99/447; 99/450; 99/400; 99/401; 126/41 R; 126/39 D
[58] Field of Search ............ 99/400, 401, 385, 444, 99/446, 447, 450; 126/41 R, 39 D, 39 B, 39 K, 39 H, 51

[56] References Cited

U.S. PATENT DOCUMENTS

| 2,253,834 | 6/1941 | Volks | 126/41 |
|---|---|---|---|
| 4,335,705 | 6/1982 | Kurotaki | 126/41 R |
| 4,432,274 | 2/1984 | Kurotaki | 99/400 |
| 4,781,170 | 11/1988 | Perl | 126/41 R |
| 5,117,747 | 6/1992 | Kuechler | 99/400 |
| 5,313,877 | 5/1994 | Holland | 99/400 |

FOREIGN PATENT DOCUMENTS 1155621 5/1958 France .
1151852 5/1969 United Kingdom .

Primary Examiner—David A. Scherbel
Assistant Examiner—Reginald L. Alexander
Attorney, Agent, or Firm—Young & Thompson

[57] ABSTRACT

The cooking appliance includes a cooking plate (1) which is removable and provided with openings (2), heating elements (3) mounted beneath the plate (1) and a container (7) for collecting the fats from cooking. The lower face of the cooking plate (1) includes housings (9) of "U"-shaped cross section above the heating elements (3), the openings (2) not emerging into the housings (9). These housings (9) rest at their lower part on a metal wall (10) separate from the housings (9) and are adjacent to the edges of the cooking plate (1).

11 Claims, 4 Drawing Sheets

FIG_2

COOKING APPLIANCE HAVING A COOKING PLATE PROVIDED WITH OPENINGS

FIELD OF THE INVENTION

The present invention relates to a cooking appliance having a cooking plate provided with openings.

It also relates to cooking appliances of the gas grill or barbecue type, which may be used without unpleasantness inside a house.

BACKGROUND OF THE INVENTION

Known appliances include, vertically, to the rear of the cooking surface, or else horizontally, above the cooking surface, radiant panels enabling the cooking plate to be heated and the food to be cooked. However, this type of construction is hardly ever used, since it does not enable good cooking uniformity to be obtained.

Other known appliances include a layer of lava stones which is arranged between the burners or the resistor, which are located at the bottom of a vessel, and the cooking grille. The lava stones make it possible for the temperature of the cooking grille to be made uniform and for part of the fats from cooking, which flow from the food through the cooking grille, to be retained.

However, this device does not make it possible for the fats from cooking to be prevented from falling onto the burners.

Fires and major releases of toxic substances, due to the pyrolysis of the fats, occur very frequently.

Other appliances have been designed so as to prevent the fats from falling directly onto the heating elements, and include metal sections which channel the fats and convey them away from the heating elements.

However, this type of appliance is complicated to manufacture and expensive since a metal section has to be located beneath each opening of the cooking plate in order to collect the fats. In addition, this complicated structure does not facilitate the cleaning of the appliance and of the cooking grille.

Such an appliance is described in U.S. Pat. No. 2,253,834. Gas rails are arranged between each opening of the cooking grille, between two channels enabling the fats to be collected. The latter are therefore strongly heated when they flow from the cooking plate and when they remain in the metal channels.

Major releases of smoke and fires from the fats may frequently be observed.

OBJECT OF THE INVENTION

The object of the present invention is to overcome the aforementioned drawbacks. It especially enables an inexpensive cooking appliance to be obtained having excellent conditions for the cooking of food inside a house and for the cleaning of the cooking grille.

SUMMARY OF THE INVENTION

The cooking appliance addressed by the present invention includes a metal cooking plate, which is removable and provided with openings, heating elements mounted beneath the cooking plate and a container for collecting the fats from cooking, the lower face of the cooking plate including housings of substantially "U"-shaped cross section above the heating elements, said openings not emerging into the housings.

According to the invention, the cooking appliance is one in which said housings rest, at their lower part, on a metal wall separate from the housings and are adjacent to the edges of the cooking plate.

As a consequence, the heating of the cooking plate is carried out in an area separate from the cooking area provided with openings.

The cooking of the food is therefore performed outside the heating area of the plate.

Thus, any possibility of contact of the cooking fats with the heating element is eliminated. The risks of the fats catching fire are therefore non-existent and the food is not impaired by the pyrolysis products coming from the combustion of the fats.

The appliance may therefore be used inside a house and cooking of the food, identical to that obtained traditionally on an outside barbecue, may be carried out without harm in a dining room.

The heating of the cooking plate is principally carried out by the conduction of heat, from the housings, toward the food-cooking area.

The cooking appliance includes a removable cooking plate which may be separated from the rest of the appliance and from the heating elements, thereby enabling the cooking plate to be easily cleaned with complete safety.

According to a preferred version of the invention, the heating element is mounted beneath the metal wall, the wall including an opening substantially parallel to the heating element.

Thus, the housing forms a substantially closed cavity in which air, heated by the heating element, enables the temperature of the cooking plate to rise very rapidly.

According to a preferred version of the invention, the heating elements are gas rails.

Thus, the gas burners are isolated from the food and the combustion gases escaping from the gas rails are channeled into the housings and are discharged at the center of the appliance.

According to an advantageous version of the invention, the lower face of the cooking plate furthermore includes ribs extending between the housing and the lower face of the cooking plate.

These ribs conduct the heat and enable the temperature of the cooking plate to be made uniform so as to obtain uniform cooking of the food over the entire cooking surface.

According to another advantageous version of the invention, the housings are adjacent to the edges of the plate and at least one opening exists between said metal wall and a wall of the housings. Air may therefore easily circulate between the lower part of the housing and the metal wall on which the housing rests. These secondary-air inlets enable the operation of the burners to be enhanced and the thermal efficiency of the appliance to be increased.

In addition, the air heated in the housing is propagated beneath the cooking plate and contributes to raising the temperature of the cooking plate. The thermal efficiency of the appliance is therefore excellent.

BRIEF DESCRIPTION OF THE DRAWINGS

Other particular features and advantages of the invention will further appear in the description hereinbelow. In the appended drawings, given by way of non-limiting examples.

DETAILED DESCRIPTION OF THE PREFERRED EMBODIMENTS

Figure 1:
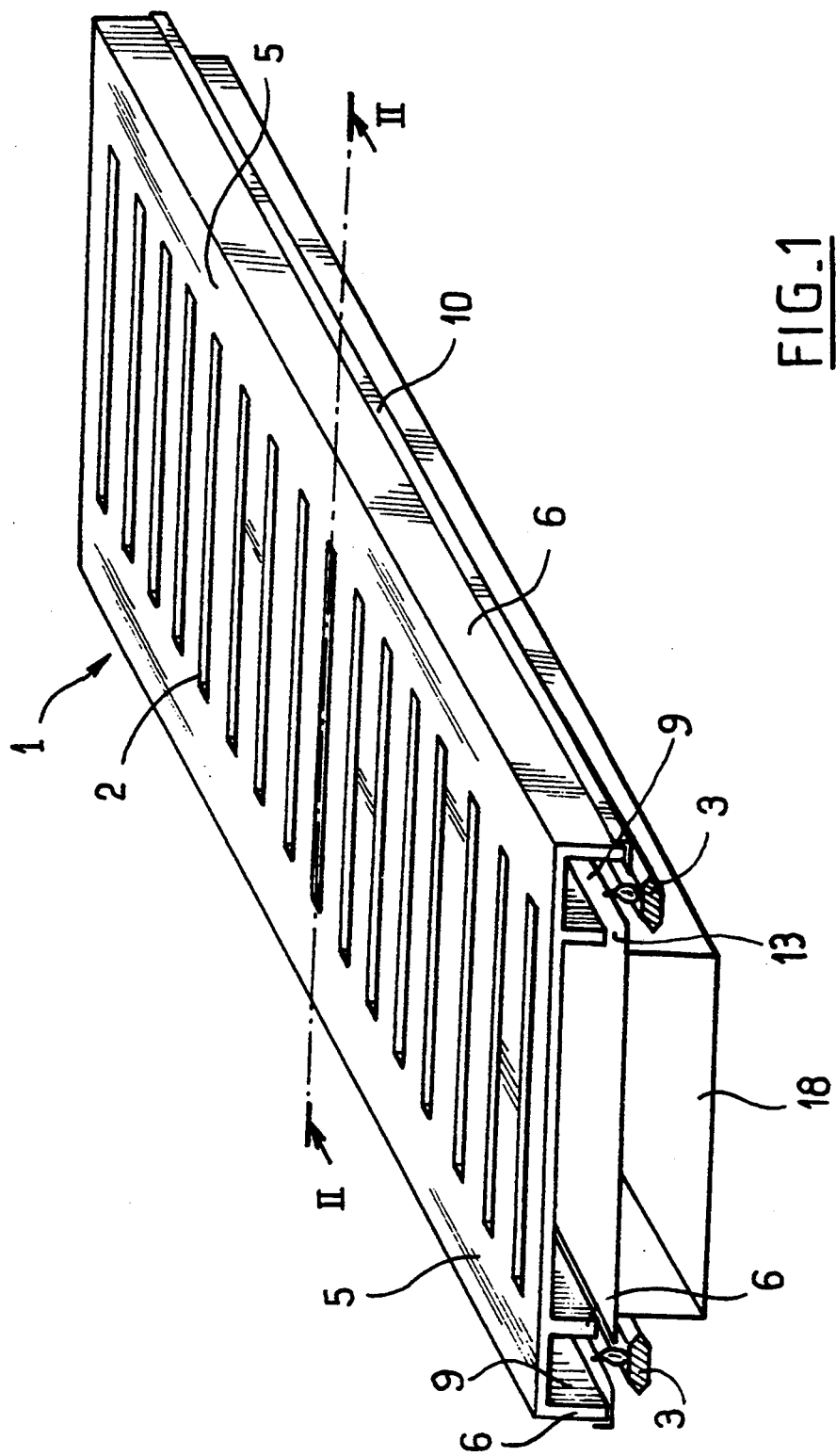
FIG. 1 is a perspective view of the cooking appliance according to the invention.

The cooking appliance, as illustrated in FIG. 1, includes a cooking plate 1 produced from very thick metal of the aluminum, steel or cast-iron type. This plate 1 is provided with openings 2 consisting of a series of parallel slots 2 which extend widthwise over the cooking appliance. These slots 2 locally pass through the thickness of the cooking plate 1 and emerge onto its lower face 8.

These slots 2 are arranged in the food-cooking area of the cooking plate 1.

Heating elements 3 are arranged beneath the cooking plate 1, in the longitudinal direction of the appliance, at the periphery of the cooking area.

These heating elements 3 are gas rails which include a series of burners.

These gas rails are fixed to the body of the appliance and are joined together at one end of the appliance in order to be supplied by a single gas source (not shown). Conventionally, a gas thermostat in conjunction with a sensor placed in the proximity of the cooking plate 1 make it possible to regulate the inflow of the gas distributed to the burners so as to maintain the cooking plate 1 at the desired temperature.

Figure 2:
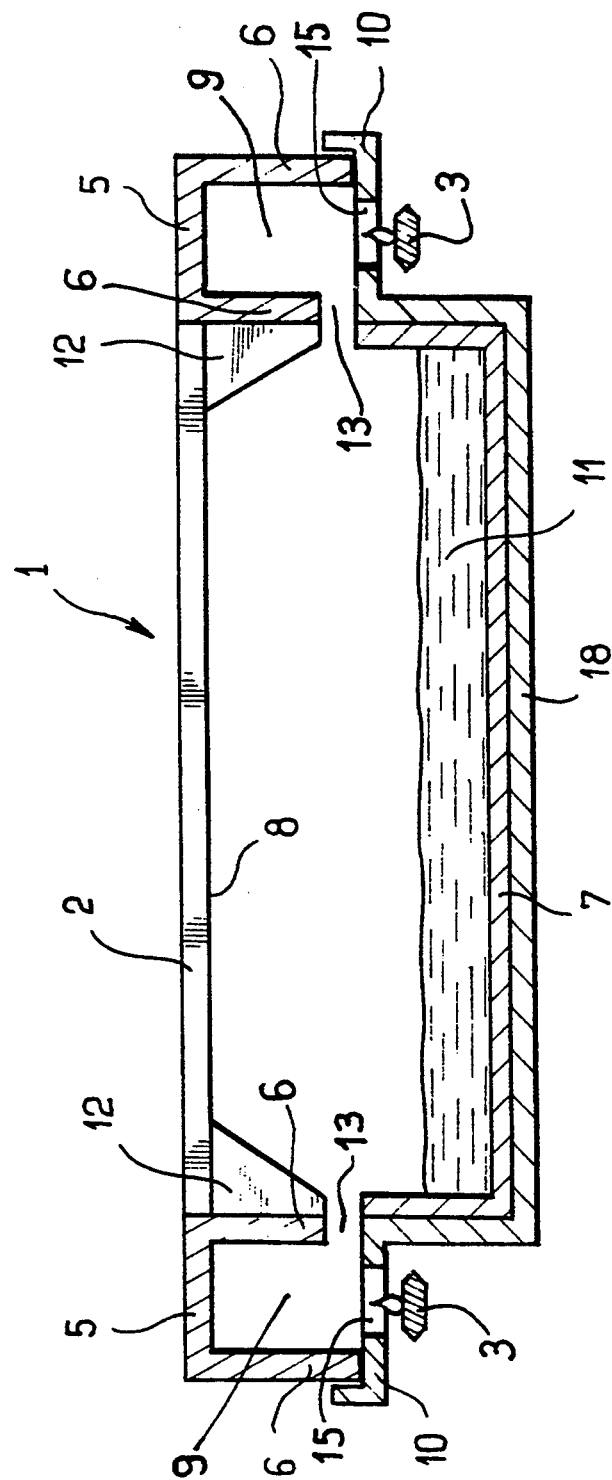
FIG. 2 is a sectional view along II—II of FIG. 1.

As shown in FIG. 2, a container 7 for collecting the fats from cooking is placed beneath the cooking area of the cooking plate 1 inside the baseplate 18 of the appliance, that is to say beneath the openings 2.

Preferably, water 11 is poured into the collecting container 7 so as to cool the molten fats and to prevent any emission of smoke.

The collecting container 7 is interrupted in line with the housings 9 so as to prevent this container 7 from overheating and the water which it contains from evaporating too rapidly.

Since the heating elements 3 are placed outside the cooking area, a single collecting container 7, uninterrupted over the entire food-cooking area, may be used.

As shown in FIG. 2, the lower face 8 of the cooking plate 1 includes housings 9 of substantially "U"-shaped cross section above the gas rails 3. The slots 2 do not emerge into the housing 9 but, on the contrary, terminate on the portions 5 of the cooking plate 1 which are adjacent to the housings 9.

Preferably, the cooking plate 1 and the housings 9 are molded as a single piece. The base of the "U"-shaped housings 9 is therefore constituted by a portion 5 of the cooking plate 1 which does not include openings 2.

In addition, the housings 9 rest, at their lower part, on metal walls 10 which are separate from the housings 9 and which are integral with the baseplate 18. These walls 10 include an opening 15 which extends substantially parallel to the gas rails 3.

Thus, the gas rails 3 are sheltered from the fats from cooking which flow through the slots 2. There is therefore no risk of pyrolysis of the fats and the food cannot therefore be contaminated by pyrolysis products.

The cooking plate 1 is simply laid on these metal walls 10. The cooking plate 1 is therefore easily removable and may therefore be separated from the rest of the appliance and from the burners when cleaning of this plate is undertaken.

The housings 9 are adjacent to the longitudinal edges of the cooking plate 1 and are thus perpendicular to the series of parallel slots 2. These housings 9 rest on the metal wall 10 by means of the wall 6 of the housings 9 which is arranged outside the cooking appliance. The other wall 6 of each housing 9, arranged inside the cooking appliance, terminates slightly above the metal plate 10 so as to create an opening, on the sides of the appliance, via which a secondary-air inflow is delivered to the burners of the gas rail 3.

In addition, the hot air from the housings 9 escapes beneath the cooking plate 1.

This cooking appliance therefore allows enhanced cooking of the food by contact with the cooking plate 1 and by convection of the hot air through the slots 2.

As shown in FIG. 2, the lower face 8 of the cooking plate 1 includes ribs 12 extending between the walls 6 of the housings 9 and the lower face 8 of the cooking plate 1.

These ribs 12 make it possible to enhance the conduction of heat between the housings 9, directly exposed to the flames, and the cooking plate 1.

The uniformity of the temperature of the cooking plate 1 is thus greatly enhanced, thereby making it possible to have uniform cooking of the food over the entire cooking plate 1.

Figure 3:
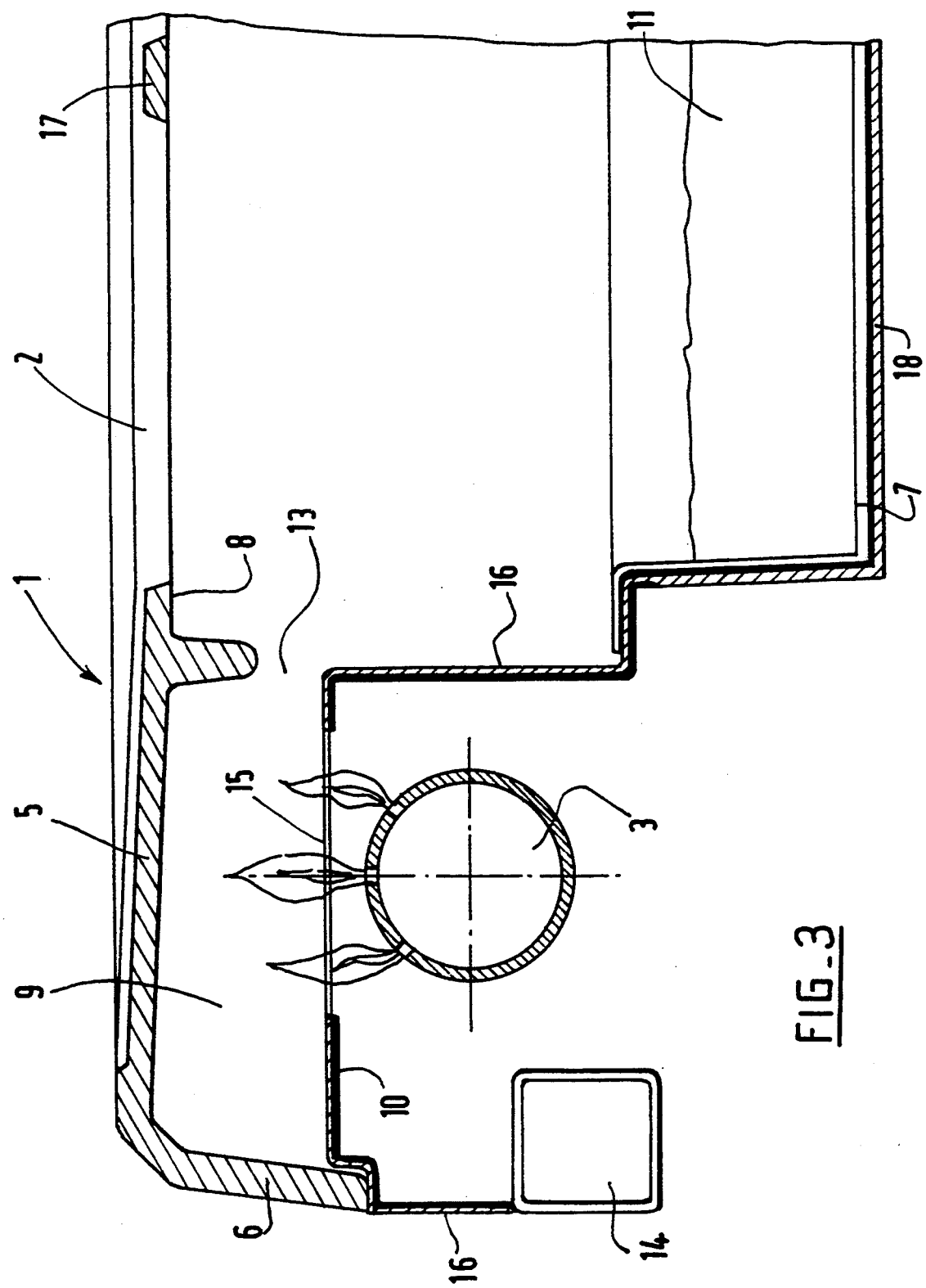
FIG. 3 is a partial sectional view of one embodiment of the invention.

As shown in FIG. 3, the metal wall 10 comprises flanges 16 surrounding the gas rails 3 on each side of the appliance. These flanges 16 act as protectors for the user as regards the gas rails. In addition, these flanges 16, extending downward and surrounding the gas rails 3, prevent any loss of heat via the sides of the appliance and enable the heat released in the housings 9 to be channeled, thus enhancing the thermal efficiency of the appliance.

These flanges 16 rest on the external structure 14 of the appliance, this structure consisting of tubes 14 of square cross section.

In this embodiment of the invention, the cooking plate 1 includes tranverse slots 2 which are interrupted at the center of the appliance by plate portions 17.

In addition, the slots 2 are started over the entire cooking plate 1, although they emerge only on parts of the plate 1 overhanging the container 7 for collecting the fats. Thus, an even design is obtained on the surface of the food grilled on the plate 1.

Of course, the invention is not limited to the exemplary embodiments described hereinabove, and numerous modifications may be made to these without departing from the scope of the invention.

Thus, the openings 2 may have any shape and distribution whatsoever.

The housings 9 may be produced separately from the cooking plate 1, and then fixed to the latter subsequently.

Figure 4:
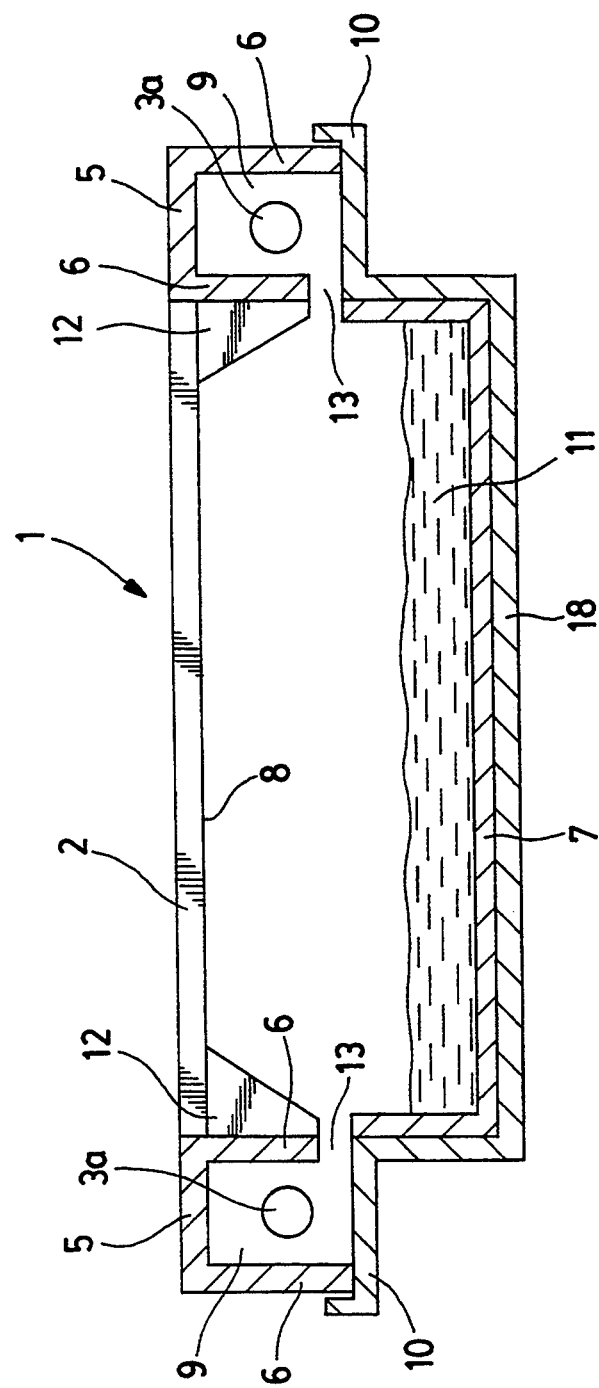
FIG. 4 is a view similar to FIG. 2 but showing another embodiment of the invention.

As shown in FIG. 4, the heating elements 3 may instead be tubular shielded electrical resistors 3a which are disposed inside the housings 9, above the metal wall 10, the latter not including any openings 15. This metal wall 10 therefore acts as a reflector.

The wall 6 of the housings which is located inside the cooking plate 1 may rest over the major part of its length on the metal wall 10 and may include a series of openings distributed over its length.

The cooking plate 1 may also be in two or more parts.

I claim:

1. A cooking appliance comprising a removable metal cooking plate extending in a longitudinal direction, said cooking plate including openings extending through the plate, said cooking appliance comprising heating elements mounted beneath the cooking plate and a container between said heating elements for collecting fats from cooking, the lower face of the cooking plate comprising housings of downwardly opening substantially U-shaped cross-section extending along opposite longitudinal edges of the cooking plate above the heating elements, said openings terminating on the portions of the cooking plate which are adjacent to said U-shaped housings, wherein said U-shaped housings are integral with said metal cooking plate, said metal cooking plate resting removably by means of a lower part of an outer wall of said U-shaped housings on support means of a body of said cooking appliance, and the heating elements being arranged in such a manner below the U-shaped housings that the central part of the cooking plate is heated mainly by conduction of heat from the said housings.

2. A cooking appliance as claimed in claim 1, wherein the lower face of the cooking plate furthermore includes ribs extending between an inner wall of the housing and the lower face of the cooking plate.

3. A cooking appliance as claimed in claim 2, which further comprises at least one opening between said cooking appliance body and an inner wall of said housings.

4. A cooking appliance as claimed in claim 2, wherein the container adapted to receive fats contains water.

5. A cooking appliance as claimed in claim 2, wherein the container adapted to receive fats is interrupted in line with said housings.

6. A cooking appliance as claimed in claim 2, wherein the heating elements are electrical resistors placed between the two walls of the U-shaped housings, respectively.

7. A cooking appliance as claimed in claim 2, wherein the cooking plate includes a series of transversely extending parallel slots forming openings through the plate, said slots terminating on the portions of the cooking plate which are adjacent to the housings.

8. A cooking appliance as claimed in claim 7, wherein the heating elements are gas rails.

9. A cooking appliance as claimed in claim 8, wherein said support means of the cooking appliance body are a metal wall.

10. A cooking appliance as claimed in claim 9, wherein each gas rail is mounted beneath the corresponding metal wall, said wall including an opening substantially parallel to the gas rail.

11. A cooking appliance as claimed in claim 10, wherein said metal was comprises flanges surrounding the gas rail.

* * * * *